(12) United States Patent
Anderseck

(10) Patent No.: US 10,035,203 B2
(45) Date of Patent: Jul. 31, 2018

(54) METHOD AND APPARATUS FOR SEPARATING HOLLOW SECTIONS

(71) Applicant: Ulrich Bruhnke, Ehningen (DE)

(72) Inventor: Ralf Anderseck, Rudelzhausen (DE)

(73) Assignee: Ulrich Bruhnke, Ehningen (DE)

( * ) Notice: Subject to any disclaimer, the term of this patent is extended or adjusted under 35 U.S.C. 154(b) by 217 days.

(21) Appl. No.: 14/891,817

(22) PCT Filed: May 13, 2014

(86) PCT No.: PCT/DE2014/000245
§ 371 (c)(1),
(2) Date: Nov. 17, 2015

(87) PCT Pub. No.: WO2014/187441
PCT Pub. Date: Nov. 27, 2014

(65) Prior Publication Data
US 2016/0101475 A1    Apr. 14, 2016

(30) Foreign Application Priority Data

May 18, 2013    (DE) .......................... 10 2013 008 632

(51) Int. Cl.
*B21C 35/02*    (2006.01)
*B23D 33/02*    (2006.01)
*B21D 28/28*    (2006.01)

(52) U.S. Cl.
CPC .............. *B23D 33/02* (2013.01); *B21C 35/02* (2013.01); *B21D 28/28* (2013.01)

(58) Field of Classification Search
CPC ...... B21D 26/035; B21D 28/28; B23D 21/00; B23D 21/006; B23D 31/002; B23D 33/02; B21C 35/00; B21C 35/04; B21C 35/02
See application file for complete search history.

(56) References Cited

U.S. PATENT DOCUMENTS

| 3,747,450 | A | * | 7/1973 | Hudson | B21D 28/10 83/188 |
| 4,082,026 | A | | 4/1978 | Miyazaki | |
| 5,133,492 | A | * | 7/1992 | Wohrstein | B23D 31/002 225/101 |
| 5,927,129 | A | | 7/1999 | Thoms et al. | |
| 9,550,318 | B2 | * | 1/2017 | Bradford | B29C 47/0028 |
| 2007/0210592 | A1 | * | 9/2007 | Koelln | B21D 26/035 293/122 |
| 2010/0045073 | A1 | | 2/2010 | Pedersen | |

FOREIGN PATENT DOCUMENTS

| DE | 2620545 A1 | 12/1976 |
| DE | 197 17 066 | 2/1998 |
| DE | 198 39 727 | 3/2000 |
| DE | 10036775 C1 | 4/2002 |
| JP | 57-181729 | 11/1982 |
| JP | 57-190733 | 11/1982 |
| WO | WO-2006/022555 | 3/2006 |

* cited by examiner

*Primary Examiner* — Edward Tolan
(74) *Attorney, Agent, or Firm* — Smartpat PLC

(57) ABSTRACT

A method for separating hollow sections after the extrusion process, the hollow sections being separated to create a component with a predefined geometrical shape by way of a punching operation.

2 Claims, 4 Drawing Sheets

METHOD AND APPARATUS FOR SEPARATING HOLLOW SECTIONS

TECHNICAL FIELD

The invention relates to a method and an apparatus for separating and shaping hollow sections, formed as twin wall panels or sections, by way of punching to produce a prescribed geometrical component shape following an extrusion process.

Metal hollow sections are produced by way of extrusion. Struts located within the hollow section for reinforcing the hollow section with regard to torsional stress can be pressed in the extrusion process.

Hollow sections, referred to as twin wall panels, are used as bearing elements in many industries. Specifically in automobile manufacturing, the shape is not always rectangular or square, but rather must be appropriately adapted to the installation situation. These often have a complicated geometrical shape.

When shaped parts are manufactured, the hollow sections must be trimmed to useful lengths and shapes by way of a suitable separation process. This is accomplished, for example, using what is referred to as blasting methods, such as laser cutting or water jet cutting, as well as by way of contour milling. These methods are significantly more expensive than a punching operation.

Cutting such bodies is problematic, since the webs forming them must not be bent in the process. Especially when the bodies are to be cut crosswise to their structure, the cutting forces deform the areas of the cutting point. If these sections are thus bent, they are unable to fully accommodate tensile or supporting forces or, at the connection points, they lose the resisting torque provided by the hollow sections.

A method for separating extruded hollow sections and an extrusion device are known from patent DE 197 17 066 C1. In this example, the interior of the extruded hollow section is filled, at least at the separation point or points, with a lightweight construction material such as, for example, an expansive foam mass, as core material, which improves the separability and stability properties when trimming and cutting the hollow section.

The disadvantage in this case is that the separating jet or beam widens and scatters upon entering the interior of the section. In addition, the disadvantages of introducing the core material are that the space occupied by the core material cannot be technologically used in another way, any thermal insulation values may be impacted, fire regulations may be violated, the core material may have a negative effect during further processing of the hollow section and additional expenses may ultimately arise for the core material and the introduction thereof.

The object of the invention is to propose a method and an apparatus for separating and shaping extruded hollow sections which are formed as twin wall panels or -sections, with which extruded hollow sections can be cost-effectively trimmed to useful lengths and shapes while maintaining the cavities, without the chambers being deformed by way of the separation process and thereby negatively impacting the resistance torque provided by the cavities.

In addition, cracks in the deformed webs are to be prevented. Through crack expansion, these could develop further, resulting in part failure.

SUMMARY

According to the invention, the object is solved by the features according to the characterizing parts of claim 1 and claim 3. Further embodiments of the invention arise from the dependent claims as well as from the following exemplary embodiment.

The method according to the invention facilitates the separating and shaping of hollow sections by way of a punching operation, ideally immediately following the extrusion process at a temperature range above 200° C.

The method may, however, also be performed in the room temperature range for certain highly ductile alloys.

The separating and shaping of hollow sections which are formed as twin wall panels or -sections to produce a prescribed geometrical component shape is realized by way of a punching operation. Prior to the start of the punching operation, one or more sliders are driven into the individual cavities of the hollow section, serving as auxiliary die plates. During the punching operation, the top face between the webs is first separated along the auxiliary die plates by way of the front punching edge of the punching die and bent by way of the rear punching edge, which is offset in height, thereby closing off the cavities of the hollow section. Thereafter the bottom face is separated by the rear punching edge and the webs are separated by cutting edges which are arranged in gaps of the punching die.

The apparatus for performing the method essentially consists of a top plate, a punching die, one or more sliders serving as auxiliary die plates, which can be driven into the cavities of the twin-wall sheets by a hydraulic cylinder, a section stripper, a die plate and a bottom plate. Both the sliders and the punching die are designed corresponding to the geometrical shape to be produced.

The punching die has a front and a rear punching edge, the rear punching edge being offset in relation to the front punching edge. Gaps in the punching die are provided in the area of the webs and walls of the hollow sections. Provided in the gaps are cutting edges for webs and outer walls of the hollow sections, respectively, these being offset in relation to the front and rear cutting edge.

BRIEF DESCRIPTION OF THE DRAWINGS

The invention is described in greater detail by way of an exemplary embodiment. Shown are.

DETAILED DESCRIPTION

Figure 1:
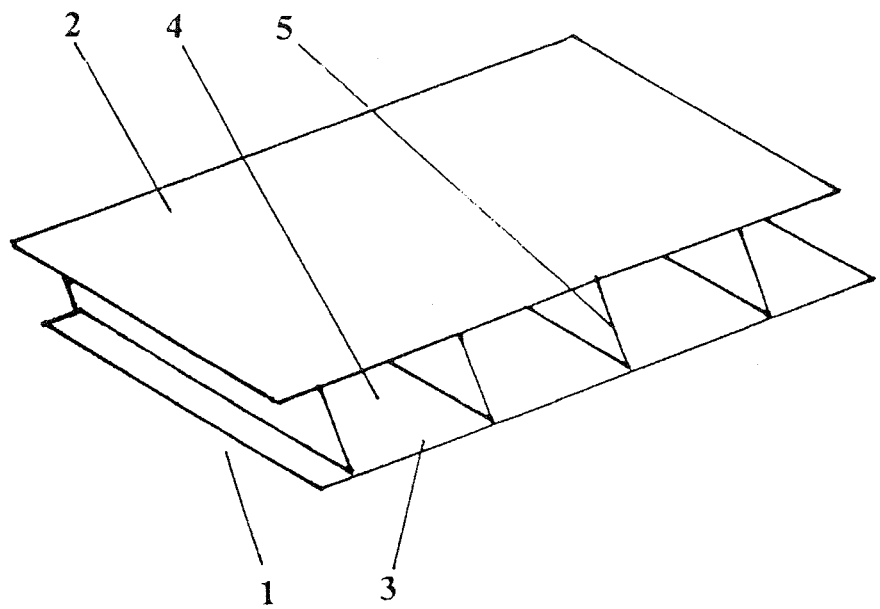
FIG. 1—Twin wall section
FIG. 2—End trimming of a twin wall section
FIG. 3—Side view of a punching die
FIG. 4—Position I—insertion of the twin wall section
FIG. 5—Position II—die cut 1 and bending
FIG. 6—Position III—die cut 2
FIG. 7—Position IV—stripping

FIG. 1 shows a hollow section in the form of a twin wall section 1 which comprises a top face 2 for punching, a bottom face 3 for punching, a cavity 4 lying there between, and webs 5.

Figure 2:
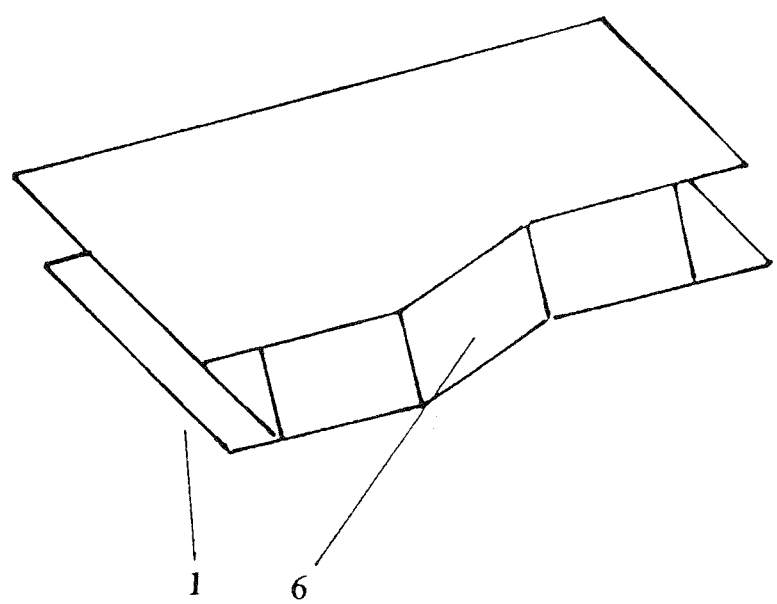

FIG. 2 shows an exploded view of the twin wall section 1 with a typical end trimming 6 of a twin wall section 1.

Figure 3:
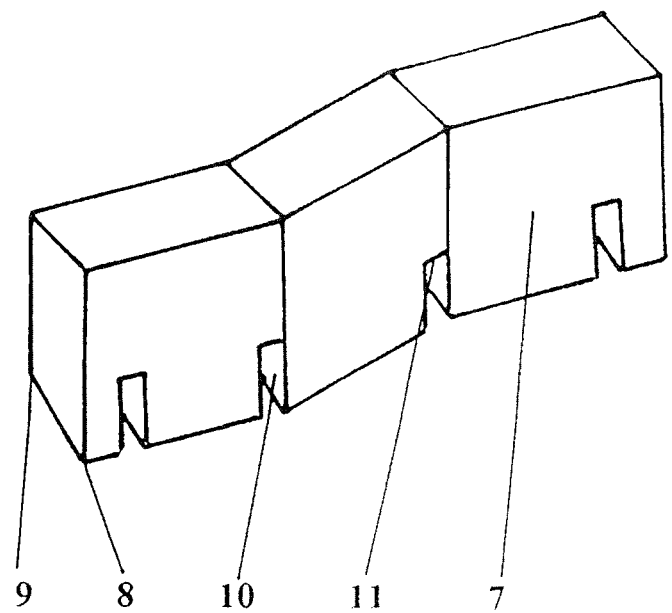

FIG. 3 shows the separating tool, the punching die 7, with punching edges 8, 9 for punching the twin wall section 1 each of which is sharpened at different levels on parallel sides and can differ in design depending on the useful length of the contour. The punching die 7 has a front 8 and a rear cutting edge 9, the rear cutting edge 9 being offset in relation to the front cutting edge 8 in such a manner that the front cutting edge 8 first cuts through the top face 2 in the area of the auxiliary die plate 14 and, during the descent of the punching die 7, the top face 2 is bent between the webs 5, so that the cavities of the twin wall section 1 are closed.

Figure 5:
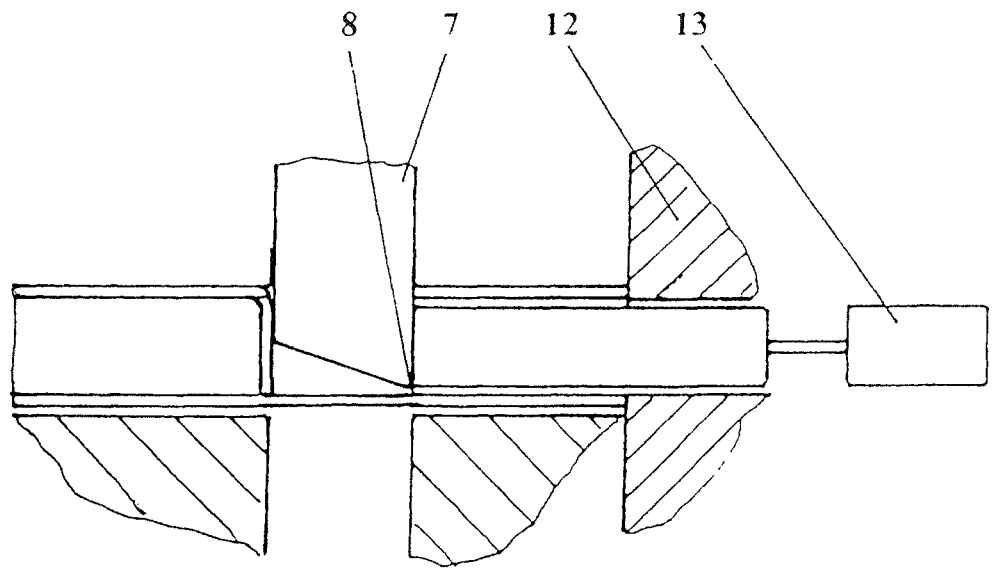
Figure 6:
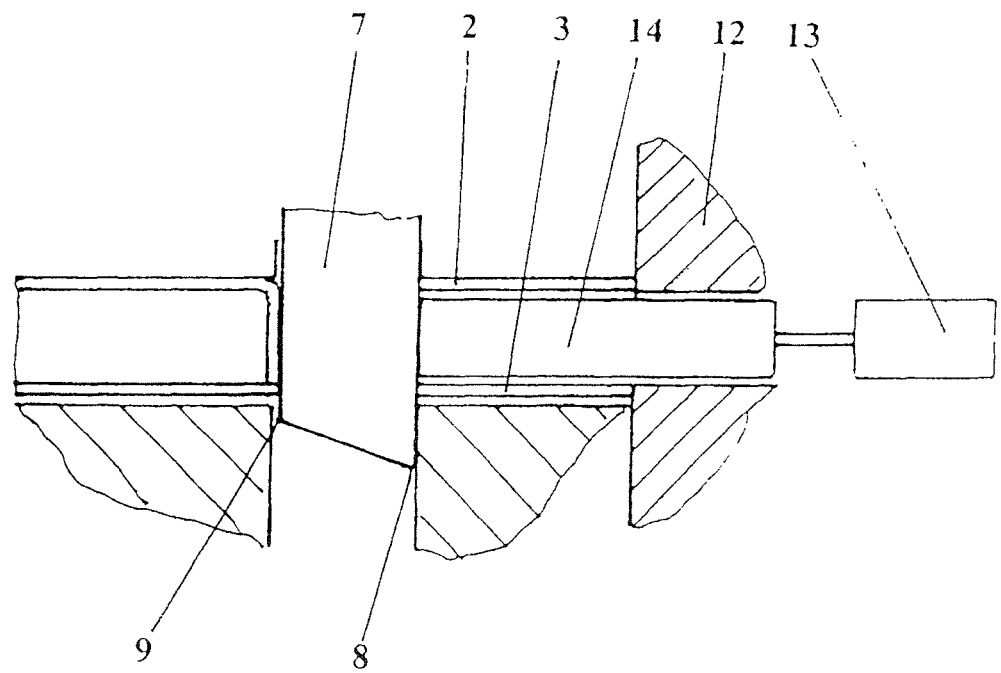

After the top face 2 is folded between the webs, the separation of the webs 5 is accomplished by the cutting edges 11 of the punching die 7 provided in the gaps 10 in the front cutting edge 8 and the rear cutting edge 9 and separation of the bottom face 3 of the twin wall section 1—(FIGS. 5 and 6).

Figure 4:
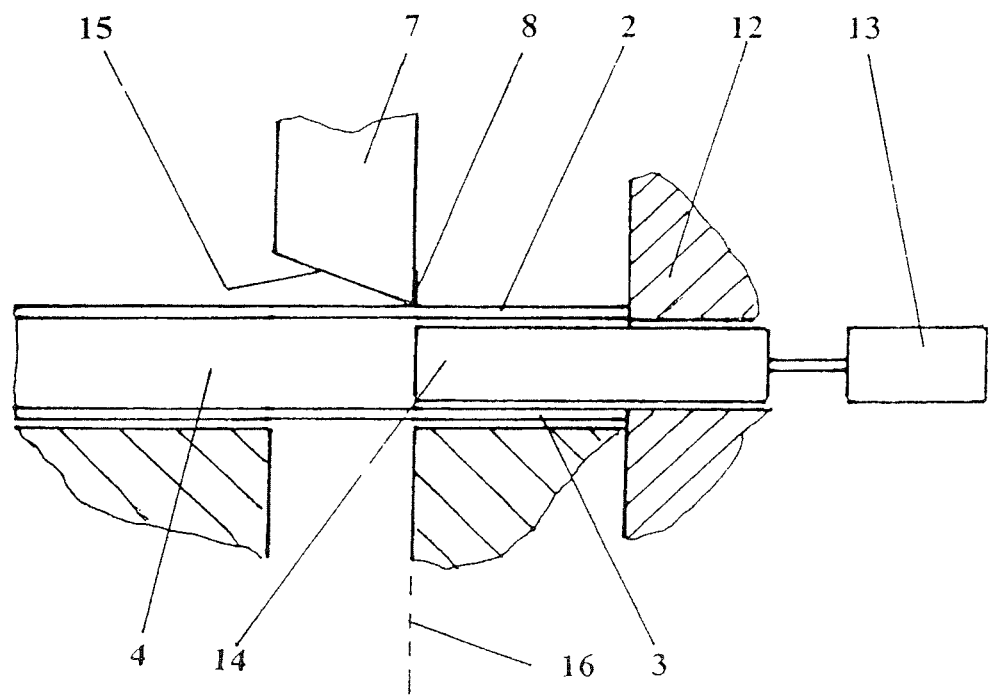

FIG. 4 shows the insertion position of the twin wall section 1 in the apparatus. The twin wall section 1 is slid into position with the top face 2 and bottom face 3 flush against the stripping plate 12 and is fixed in this position by a hold-down device (not shown). An auxiliary die plate 14 is introduced into the cavity or cavities 4 of the twin wall section 1 by a hydraulic cylinder 13 until the front vertical face of the auxiliary die plate 14 forms an imaginary vertical line 16 with the front punching edge 8 of the punching die 7.

The punching die 7 is then driven in the direction of the twin wall section 1, the punching edge 8 of the punching die 7 penetrating the top face of the twin wall section 1 and separating it. The movable retractable auxiliary die plate 14 prevents the top face of the twin wall section 1 from drifting downward due to theipunching pressure exerted by the punching device. The punched area between the webs 5 of the twin wall section 1 is bent in the punching direction by the face 15 of the punching die 7 lying at an angle to the top face 2, the area settling into the opening of the cavity 4 fully or partly, depending on the prescribed parameters. (FIG. 5)

At the same time, the webs 5, which are arranged vertically between the top and bottom faces, are separated by the cutting edges 11.

FIG. 6 shows the punching die 7 driving further in the direction of the bottom face 3, after which it separates the bottom face 3 first with the punching edge 8 and then with the other punching edge 9.

Figure 7:
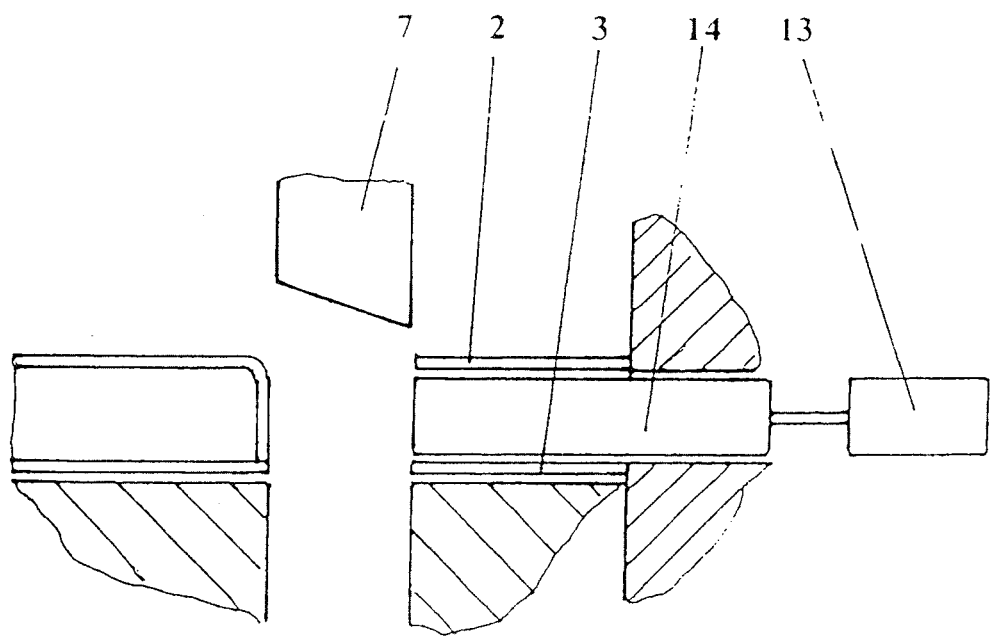

FIG. 7 shows the punching die 7 retracted into the starting position following the separation of the top face 2 and the bottom face 3 as well as the webs 5, and the auxiliary die plate 14 retracted into the starting position.

LIST OF REFERENCE NUMERALS

1—twin wall section
2—top face
3—bottom face
4—cavity
5—web
6—punching face end trimming
7—punching die
8—front punching edge
9—rear punching edge
10—gaps
11—cutting edges
12—stripping plate
13—hydraulic cylinder
14—auxiliary die plate
15—face
16—vertical line

The invention claimed is:

1. A method for separating and shaping hollow sections which are formed as twin wall panels or -sections to produce a prescribed geometrical component shape following an extrusion process, characterized in that the separating of hollow sections to produce a prescribed geometrical component shape is realized through a punching operation, wherein during the punching operation a front punching edge (8) of a punching die (7) first separates a top face (2) of the hollow section between two webs (5) and a rear punching edge (9) of the punching die (7) bends the top face (2) to close off individual cavities (4) and wherein during a descent of the punching die (7) a bottom face (3) is separated by the rear punching edge (9) and then the webs (5) are separated by cutting edges (11) which are arranged in gaps (10) of the punching die (7).

2. The method according to claim 1, characterized in that auxiliary die plates (14) are driven into the individual cavities (4) of the hollow sections prior to the start of the punching operation.

\* \* \* \* \*